(12) United States Patent
Li

(10) Patent No.: US 11,908,062 B2
(45) Date of Patent: Feb. 20, 2024

(54) EFFICIENT REAL-TIME SHADOW RENDERING

(71) Applicant: Warner Bros. Entertainment Inc., Burbank, CA (US)

(72) Inventor: Bo Li, Montreal (CA)

(73) Assignee: WARNER BROS. ENTERTAINMENT INC., Burbank, CA (US)

( * ) Notice: Subject to any disclaimer, the term of this patent is extended or adjusted under 35 U.S.C. 154(b) by 200 days.

(21) Appl. No.: 17/630,145

(22) PCT Filed: Jul. 27, 2020

(86) PCT No.: PCT/US2020/043773
§ 371 (c)(1),
(2) Date: Feb. 8, 2022

(87) PCT Pub. No.: WO2021/021755
PCT Pub. Date: Feb. 4, 2021

(65) Prior Publication Data
US 2022/0262060 A1    Aug. 18, 2022

Related U.S. Application Data

(60) Provisional application No. 62/879,179, filed on Jul. 26, 2019.

(51) Int. Cl.
*G06T 15/00*    (2011.01)
*G06T 1/60*     (2006.01)
(Continued)

(52) U.S. Cl.
CPC .............. *G06T 15/005* (2013.01); *G06T 1/60* (2013.01); *G06T 9/00* (2013.01); *G06T 15/60* (2013.01);
(Continued)

(58) Field of Classification Search
CPC .................................. G06T 15/005; G06T 1/60
See application file for complete search history.

(56) References Cited

U.S. PATENT DOCUMENTS

| | | | | |
|---|---|---|---|---|
| 2003/0112237 A1* | 6/2003 | Corbetta | ................. | G06T 15/60 345/426 |
| 2014/0176549 A1* | 6/2014 | Uralsky | ................ | G06T 15/005 345/426 |

(Continued)

FOREIGN PATENT DOCUMENTS

| | | |
|---|---|---|
| CN | 104574496 A | 4/2015 |
| KR | 10-2010-0053413 A | 5/2010 |

OTHER PUBLICATIONS

WO, PCT/US20/43773 ISR and Written Opinion, dated Feb. 4, 2021.

(Continued)

*Primary Examiner* — Shivang I Patel
(74) *Attorney, Agent, or Firm* — Bookoff McAndrews, PLLC

(57) ABSTRACT

A method for real-time shadow rendering using cached shadow maps and deferred shading by a video processor of a game console or the like includes, for at least each key frame of video output, determining a viewpoint for a current key frame based on user input, filtering a texel of a frame-specific shadow map based on a dynamic mask wherein the texel is filtered, for a shadowed light, from a static shadow map and a dynamic shadow map or from the static shadow map only, based on the dynamic mask value for the texel, and rendering the current key frame based on the frame-specific shadow map and a deferred-shadow rendering algorithm. The method enables efficient rendering of thousands of shadowed lights in large environments by consumer-grade game consoles.

19 Claims, 14 Drawing Sheets

(51) Int. Cl.
*G06T 9/00* (2006.01)
*G06T 15/60* (2006.01)

(52) U.S. Cl.
CPC ...... *G06T 2210/36* (2013.01); *G06T 2215/12* (2013.01)

(56) References Cited

U.S. PATENT DOCUMENTS

2015/0097825 A1   4/2015  Fortin
2016/0093098 A1*  3/2016  Andersson .............. G06T 15/60
                                              345/426

OTHER PUBLICATIONS

EPO, European Supplementary Search Report, dated Jul. 23, 2023.
Instanced Shadow Maps, Sebastian Buntin and Marc Stamminger, Computer Graphics Group, University of Erlangen-Nuremburg, Germany, Oct. 28, 2007.

* cited by examiner

VQ Compression Code (Pixel-Frequency)

```
uint CompressVQ(float shadow, uint2 GTid : SV_GroupThreadID, uint GroupIndex : SV_GroupIndex)
{
    uint SrcPixel = uint(shadow * 254.99f + 1.f) << ((GTid.x % 4) * 8);//0 is special number for msad
    SrcPixel |= LaneSwizzle(SrcPixel, 0x1F, 0, 0x1);
    SrcPixel |= LaneSwizzle(SrcPixel, 0x1F, 0, 0x2); //Collected 4 neighbor pixels uint CurrIndex = -1;
    [unroll]
    for (int i = 0; i < 6; i++) //Code Book size 4096=4^6
    {
        CurrIndex = CurrIndex * 4 + 4; //QuadTree next level
        uint MatchErr = msad(SrcPixel, uint2(VQCodeBookBuffer[(CurrIndex + GTid.x % 4) * 4 + (GTid.y % 4)], 0), 0);

MatchErr += LaneSwizzle(MatchErr, 0x1F, 0, THREADGROUP_SIZEX); //Accum next line
        MatchErr += LaneSwizzle(MatchErr, 0x1F, 0, THREADGROUP_SIZEX << 1); //Accum 2 lines away
        uint MatchErr_Index = (MatchErr << 8) | (GTid.x % 4); //Pack index for deterministic order
        MatchErr_Index = min(MatchErr_Index, LaneSwizzle(MatchErr_Index, 0x1F, 0, 0x1));
        MatchErr_Index = min(MatchErr_Index, LaneSwizzle(MatchErr_Index, 0x1F, 0, 0x2));
        CurrIndex += MatchErr_Index & 0xf; //Broadcasted best matching of the four children
    }
    return CurrIndex;
}
```

EFFICIENT REAL-TIME SHADOW RENDERING

CROSS-REFERENCE TO RELATED APPLICATIONS

The present application is a 371 of International Patent Application Serial No. PCT/US20/43773, filed Jul. 27, 2020, which claims priority to U.S. Provisional Patent Application No. 62/879,179 filed Jul. 26, 2019, which application is incorporated herein by reference, in its entirety.

FIELD

The present application relates to computer graphics, such as systems, apparatus and methods for rendering shadows for real-time interactive video.

BACKGROUND

Interactive video, for example as used in computer video games, places high demands on computer processing when used to render dynamic three-dimensional models using physical-based lighting models as needed to achieve realistic images. For a satisfactory user experience of interactive video responsive to user input, each key frame of video must be rendered quickly enough such that the lag between user input and the video response to the input is not noticeable during use. While the ability to perceive time lag varies between users, most users will not perceive a lag of less than about $\frac{1}{24}$ of a second (about 42 milliseconds). As used herein, "real-time" means no unnecessary delay intervenes between the input and output of a computational process. For real-time interactive video, a real-time lag of less than about 100 milliseconds, or more preferably, less than about 40 milliseconds, is desirable.

Achieving a desirable level of real-time lag when doing realistic renders of complex physical model for interactive video involves many design challenges. Those of skill in the art design for feasible computational power levels and simplify the 3D models, the rendering algorithms, or both to balance realism and complexity and deliver a user experience as good as or better than competing product. Designers must adapt to available computational power and users often prefer more complex models, if given a choice between products rendering at similar speeds. Thus, interactive video designers are continually motivated to invent new and faster rendering algorithms for 3D models.

The number of point or volumetric lights in a scene is directly proportional to rendering complexity. Night scenes with multiple lights are difficult to render in real-time at high resolution without introducing noticeable lag. One of the reasons is that each light in the scene casts a visible shadow. Computing each of these shadows realistically may introduce undesirable lag. To avoid undesirable lag, designers are limited to rendering an undesirably small number of lights in each scene reducing visual complexity or taking computational shortcuts that reduce realism.

It would be desirable, therefore, to develop new methods and algorithms for fast and efficient rendering of shadows from 3D models, that overcomes these and other limitations of the prior art.

SUMMARY

This summary and the following detailed description should be interpreted as complementary parts of an integrated disclosure, which parts may include redundant subject matter and/or supplemental subject matter. An omission in either section does not indicate priority or relative importance of any element described in the integrated application. Differences between the sections may include supplemental disclosures of alternative embodiments, additional details, or alternative descriptions of identical embodiments using different terminology, as should be apparent from the respective disclosures.

In an aspect of the disclosure, a computer-implemented method for real-time shadow rendering using cached shadow maps and deferred shading may include determining, by one or more processors, a viewpoint for a current key frame based on user input. The method may further include filtering, by the one or more processors, each texel of a frame-specific shadow map based on a dynamic mask wherein the each texel is filtered, for each shadowed light, from a static shadow map and a dynamic shadow map or from the static shadow map only, based on the dynamic mask value for the each texel. The method may further include rendering, by the one or more processors, the current key frame based on the frame-specific shadow map and a deferred-shadow rendering algorithm. The method may include performing at least the foregoing operations for at least each key frame of video output. In an aspect, the one or more processors may be, or may include, processors in a graphics processing unit (GPU), for example, a GPU of a client device.

The method may further include selecting, by the one or more processors, the static shadow map from a tiled compute shader thread group. In an aspect, the tiled compute shader thread group may include pre-allocated discrete shadow textures at different resolutions for each shadowed light, and the selecting may include choosing one of the pre-allocated discrete shadow textures having a resolution equal to or less than a resolution that provides a pixel-texel projection ratio of 1:1 for each rendered pixel of the current key frame. In another aspect, the tiled compute shader thread group may include a bindless shadow map table.

In another aspect, the static shadow map may be compressed by quantization of depth values and depth planes in texture space.

In another aspect, the method may further include generating, by the one or more processors, the dynamic shadow map and the dynamic shadow mask for the current frame. Generating the dynamic shadow mask may include extrapolating, by the one or more processors, an offset for conservative rasterization. In a related aspect, the filtering may include decompressing, by the one or more processors, the dynamic shadow map only for texels indicated by the dynamic shadow mask.

A different method may be performed by a production server for generating a tiled compute shader thread group for real-time shadow rendering using cached shadow maps and deferred shading. The production method may include allocating, by one or more processors, discrete shadow maps at different resolutions for each modeled light of a three-dimensional (3D) model. The method may further include compressing, by the one or more processors, the discrete shadow maps by quantizing each texel thereof; and arranging, by the one or more processors, the discrete shadow maps in a data structure for use in runtime rendering. In an aspect, the data structure enables use of the discrete shadow maps in a tiled compute shader thread group during the runtime rendering by a graphics processing unit (GPU).

The allocating may further include, by the one or more processors, tiling (e.g., separating) the discrete shadow maps into tiles. Each may have a predetermined dimension much smaller than the size of the shadow map in pixels. For example, the processor may separate the map into tiles each being 32 texels square. In addition, the compressing may further include compressing each tile using a quantization scheme. In an aspect, the quantization scheme may include compressing 2×2 texel squares of each of the tiles into 256 compressed quads indexed by single-byte indices for nodes of a sparse tree structure in which nodes are quads (i.e., a "QuadTree"). In another aspect, the quantization scheme may include encoding texel values truncated to one of 32-bit lossy XYZ plane values or 32-bit float4 values with a shared floating-point exponent.

In other aspects, the arranging may further include, by the one or more processors, sorting the compressed quads within the tiles in order by depth plane and encoding the compressed quads in the order in a sparse record. In another aspect, the arranging may further include, by the one or more processors, generating single-byte indices for tree nodes of the compact record based on 256 compressed quads making up each of the tiles. In addition, the arranging may further include, by the one or more processors, encoding the sparse record and single-byte indices in a computer-readable record.

As used herein, a "client device" or a "server" each include at least a computer processor coupled to a memory and to one or more ports, including at least one input port and at least one output port (e.g., a desktop computer, laptop computer, tablet computer, smartphone, PDA, etc.). A computer processor may include, for example, a microprocessor, microcontroller, system on a chip, or other processing circuit. As used herein, a "processor" means a computer processor. A client device or server may be generally referred to herein as an apparatus. An apparatus may include a memory holding program instructions, that when executed by the processor causes the apparatus to perform operations of the methods herein described.

To the accomplishment of the foregoing and related ends, one or more examples comprise the features hereinafter fully described and particularly pointed out in the claims. The following description and the annexed drawings set forth in detail certain illustrative aspects and are indicative of but a few of the various ways in which the principles of the examples may be employed. Other advantages and novel features will become apparent from the following detailed description when considered in conjunction with the drawings and the disclosed examples, which encompass all such aspects and their equivalents.

BRIEF DESCRIPTION OF THE DRAWINGS

The features, nature, and advantages of the present disclosure will become more apparent from the detailed description set forth below when taken in conjunction with the drawings in which like reference characters identify like elements correspondingly throughout the specification and drawings.

FIG. 7B is an example of code for block vector-quantization.

DETAILED DESCRIPTION

Various aspects are now described with reference to the drawings. In the following description, for purposes of explanation, numerous specific details are set forth in order to provide a thorough understanding of one or more aspects. It may be evident, however, that the various aspects may be practiced without these specific details. In other instances, well-known structures and devices are shown in block diagram form in order to facilitate describing these aspects.

Supporting lots of shadow-casting lights in a virtual environment remains a challenging problem even with modern state of the art games engines and rendering systems. Popular game engines do not scale well beyond a dozen dynamic shadowed lights on current-generation consoles, and may impose restrictions on how shadowed light should be placed due to technical limitations such as overlapping light channels or performance. Baking methods, for example light mapping, impose even more limitations in the lighting workflow with either no dynamic interaction or large performance detriments. Furthermore, light maps do not support ray marching or other view-dependent volumetric effects.

Previous algorithms for rendering many shadowed lights are tested in idealized environments such as demo scenes, while being optimized for movable lights updating every frame. However, production quality assets are often subject to more limited computational budgets that do not afford updating all shadow buffers each frame. Hence, fully dynamic light movements are rarely a major feature for games and visualization applications. The new shadow rendering methods described herein are designed to support use cases in which many stationary shadow-casting lights interact with dynamic objects moving around them in addition to static objects. The new methods meet performance and quality targets for production systems by applying several new operational features.

Figure 1:
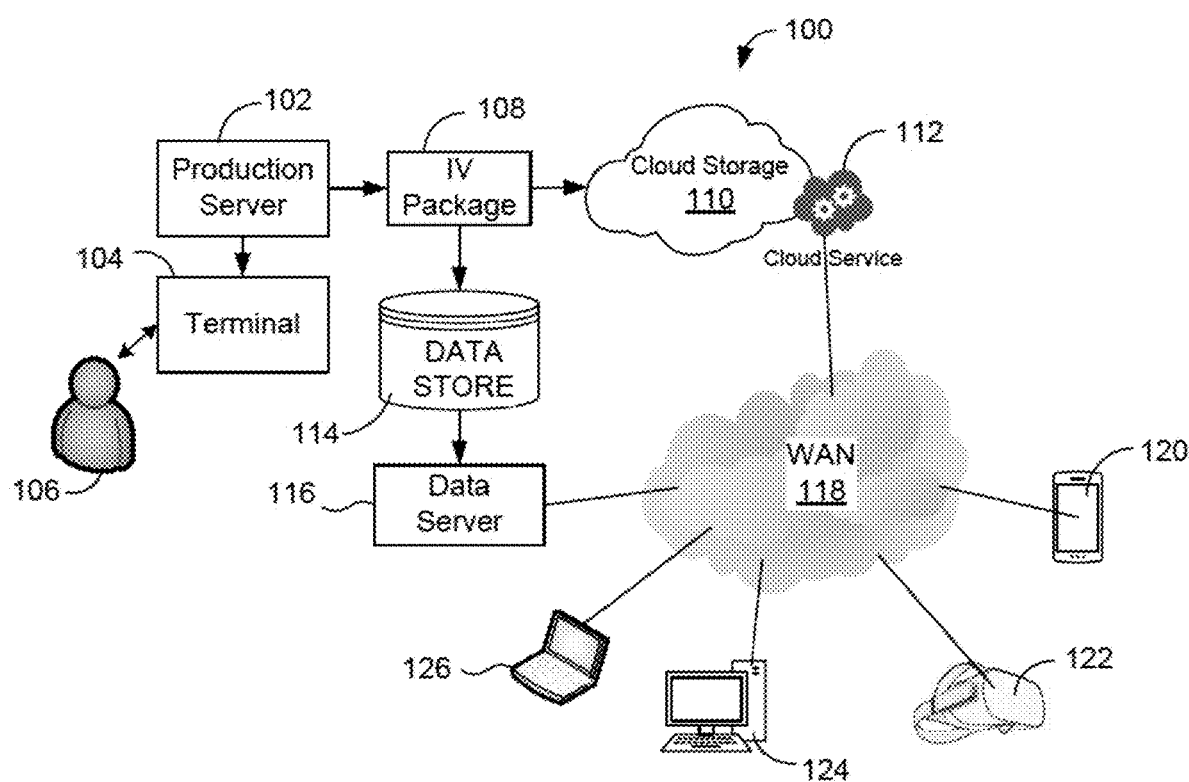
FIG. 1 is a schematic diagram illustrating a system including computing apparatus configured for performing methods as described herein for shadow rendering and supporting production operations.

FIG. 1 shows a system 100 using methods and computing apparatus as described herein for shadow rendering in production environments. A production server 102 may be operated via one or more terminals 104 in use by users 106 engaged in producing interactive video content 108. The production process may include operations as described herein for generating a tiled compute shader thread group for real-time shadow rendering using cached shadow maps and deferred shading. Once ready for distribution, an interactive video content package may be provided to a cloud storage 110 for distribution by a cloud service 112 to any suitable client device, either by digital download or by streaming. The content 108 may, in an alternative or in addition via a data store 114 and discrete data server 116, by distribution of physical media such as memory sticks or optical discs, or by any other suitable method. Receiving client devices may include, for example, smart phones 120 and similar tablets, immersive virtual reality visors 122, desktop computers 124, laptop computers 126 or specialized gaming consoles (not shown). Each of the clients includes a processor coupled to a memory for holding executable instructions and data, and to an audio-video output device or devices.

Each computing apparatus such as the production server 102 or clients 120-124 may include a random-access memory (RAM) holding program instructions and data for rapid execution or processing by the processor for performance of methods as described herein. When the apparatus 102, 120-124 is powered off or in an inactive state, program instructions and data may be stored in a long-term memory, for example, a non-volatile magnetic, optical, or electronic memory storage device. Either or both of the RAM or the storage device may comprise a non-transitory computer-readable medium holding program instructions, that when executed by the processor of the computer, cause the apparatus to perform a method or operations as described herein. Program instructions may be written in any suitable high-level language, for example, C, C++, C#, or JavaScript™, and compiled to produce machine-language code for execution by the processor. Program instructions may be grouped into functional modules, to facilitate coding efficiency and comprehensibility. It should be appreciated that such modules, even if discernable as divisions or grouping in source code, are not necessarily distinguishable as separate code blocks in machine-level coding. Code bundles directed toward a specific function may be considered to comprise a module, regardless of whether or not machine code on the bundle can be executed independently of other machine code. In other words, the modules may be high-level modules only.

Figure 2:
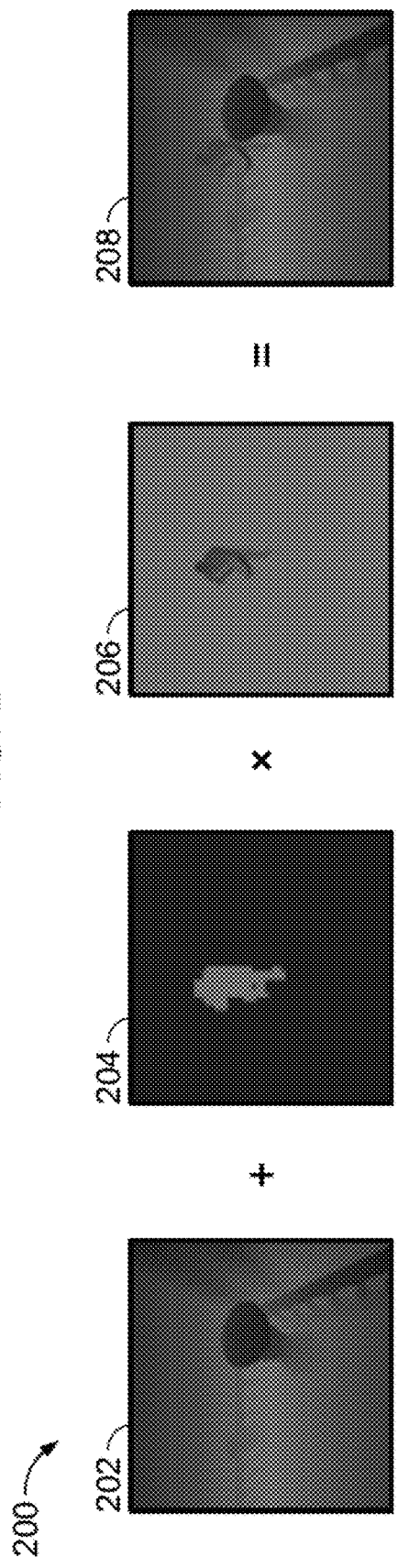
FIG. 2 shows examples of a static shadow map, a dynamic shadow map, a conservative "dirty" mask for combining the maps, and a resulting combination.

The system 100 may be designed to maximize caching of static cast shadows to avoid the need to compute static cast shadows in real time. To separate static cast shadows, the system may track three major types of interactions between modeled objects and a static bounding box for each shadow-casting light. The box may be spherical. The three interactions with the static bounding box include interactions of static meshes, vertex animated meshes, and fully-dynamic movable meshes. During rendering of interactive video, a client device may select parameters for update frequency, culling/fading distance and targeted resolution depending on the type of interaction. For each light source, the client device may manage and update three textures when necessary, as shown in FIG. 2: a static shadow buffer 202, a dynamic shadow buffer 206, and a conservative mask 204 (sometimes referred to as a "Dirty Mask texture") (see also FIG. 5 at 500) that defines how the client rendering process will combine the static and dynamic shadow buffers. Each Dirty Mask texel may be represented by a single bit indicating "true" or "false" (i.e., 1or 0). If for any rendered frame the client processor determines that no dynamic interaction between any light's bounding box and an object is occurring, it allocates only the static shadow buffer for rendering and can omit computation of a dynamic shadow buffer or Dirty Mask texture. Conversely, if the processor detects a dynamic interaction, it generates the dynamic shadow buffer and its Dirty-Mask texture in a single render-pass.

The client processor uses the Dirty-Mask texture to reduce the processor burden "cost" of shadow filtering by only filtering (e.g., adding) texels from both static and dynamic shadow buffers where corresponding Dirty-Mask texels are set to a triggering value, e.g., "true." Where the mask texels are "false," the processor may select the texel from the static shadow mask without filtering.

To improve scalability, the client processor may generate a view-dependent updating frequency for each light in the scene, using a heuristic algorithm based on screen-projected size, brightness, visibility and a user-defined resolution slider, directed to proportional allocation of CPU and GPU computational resource contributions to the final image, for regular time-slices of the rendering process.

In addition, the client processor may assign shadow maps for each light in a pre-allocated pyramid-structured textures pool characterized by having an increasing number of texture slots at each lower resolution level, to maintain a pre-defined pixel-texel quality target ratio (e.g., 1:1). With this method, the amount of memory required is roughly equivalent to the number of pixels to be rendered multiplied by the pixel-texel quality target ratio and average number of overlapping shadows, regardless of scene complexity. Runtime texture allocations are avoided in most cases.

Next, the client processor packs the shadow buffers into uniform buffers of flat texture descriptors arrays for fast GPU access indexed from shaders. Advantages of this packing over texture-atlas or texture-arrays include freedom from restrictions on texture size, memory locations, texture formats, or similar limiting parameters. The GPU then performs screen-tile culling optimized for high depth complexity scenes and generating tile filtering tasks with shadow indices for a further deferred-shadow process. The GPU may process spotlights and point lights in separate dispatch-indirect passes to optimize VGPR-limited shader-core occupancy. The client processor may then pack results of the GPU's shadow filtering then into a compact, optionally compressed buffer for further deferred-shading and lighting. Because of the flexible shadow buffer packing, other lighting effects such as single-pass local-shadowed volumetric fog can be efficiently supported by the GPU.

Client processors may execute two new compression algorithms to facilitate the processes described. First is a variable bit-rate shadow map compression algorithm to reduce static-shadow buffer generation passes. Second, a GPU-based TSVQ (Tree-Structured-Vector-Quantization) algorithm compresses deferred-shadow light masks, to support many overlapping lights per-pixel with minimal memory and bandwidth.

Depth Buffer Compression

Figure 3:
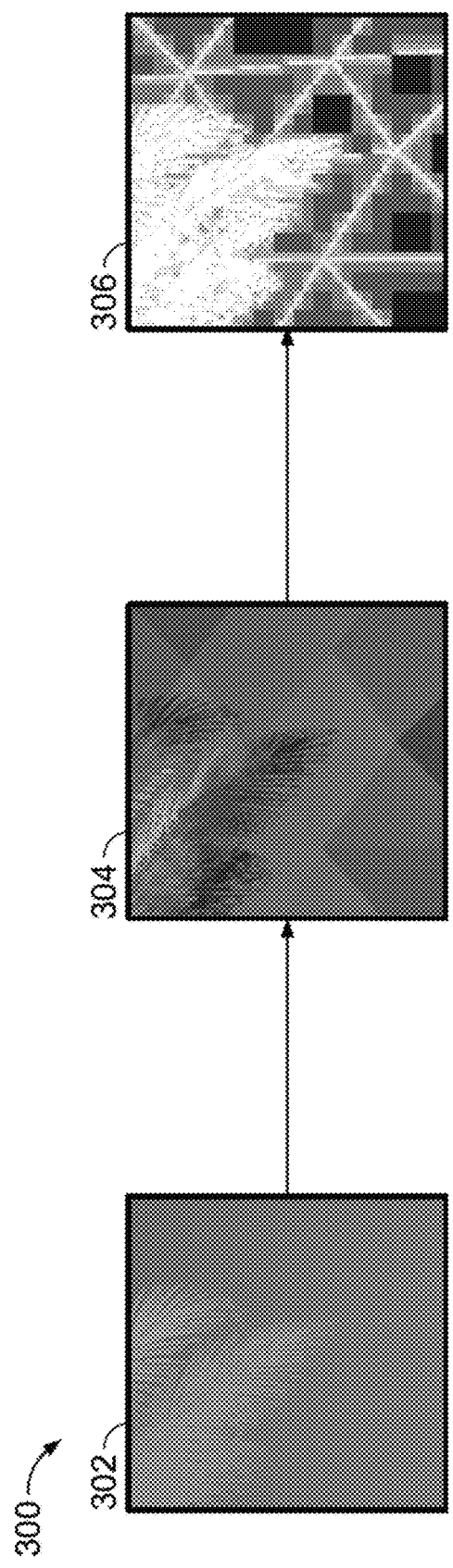
FIG. 3 illustrates an example of adaptive shadow depth compression, showing an input raw depth map, a depth map after processing into depth planes, and a compressed tree representing the depth information.

To support as many static shadow buffers as possible with minimal memory footprint, a GPU-based adaptive Quad-Tree compression algorithm achieves high throughput and a typical compression ratio of 30:1 with very slight quality losses. The algorithm includes dividing the shadow buffer into macro-blocks of small equal size (e.g., 32×32 pixels) and generating depth planes in the block to reduce floating-point errors. The GPU can the compress the blocks independently in groupshared memory to minimize bandwidth consumption. FIG. 3 illustrates examples of depth buffer compression, showing and uncompressed input depth map 302, a depth map 302 with generated depth planes, and a compressed depth map 306.

Tree-Structured-Vector-Quantization (TSVQ) for Per-Pixel Shadow Mask

Occupancy is key for high GPU performance. Thus deferred-shadow rendering may be advantageous to separate lighting and shadowing passes. Traditionally, deferred-shadow rendering requires a lot of memory to store an intermediate mask for each light channel per pixel. Therefore, a novel GPU-based TSVQ algorithm may be used to compress the output. By heavily using msad and Lane-Swizzle GPU instructions optimized into an unrolled branch-free inner loop, GPU processing can achieve an efficiency of 0.75 bit/pixel and high throughput on GPU shader cores.

Performance Results

While performance is highly data-dependent, with above-mentioned design and optimizations, significant performance improvement over a stock Unreal™ Engine 4 of up to 10× in shadow rendering performance was achieved. The systems and method are able to support over a thousand shadow-casting lights in a complex virtual environment in real-time processing without noticeable lag.

System Overview

Figure 4:
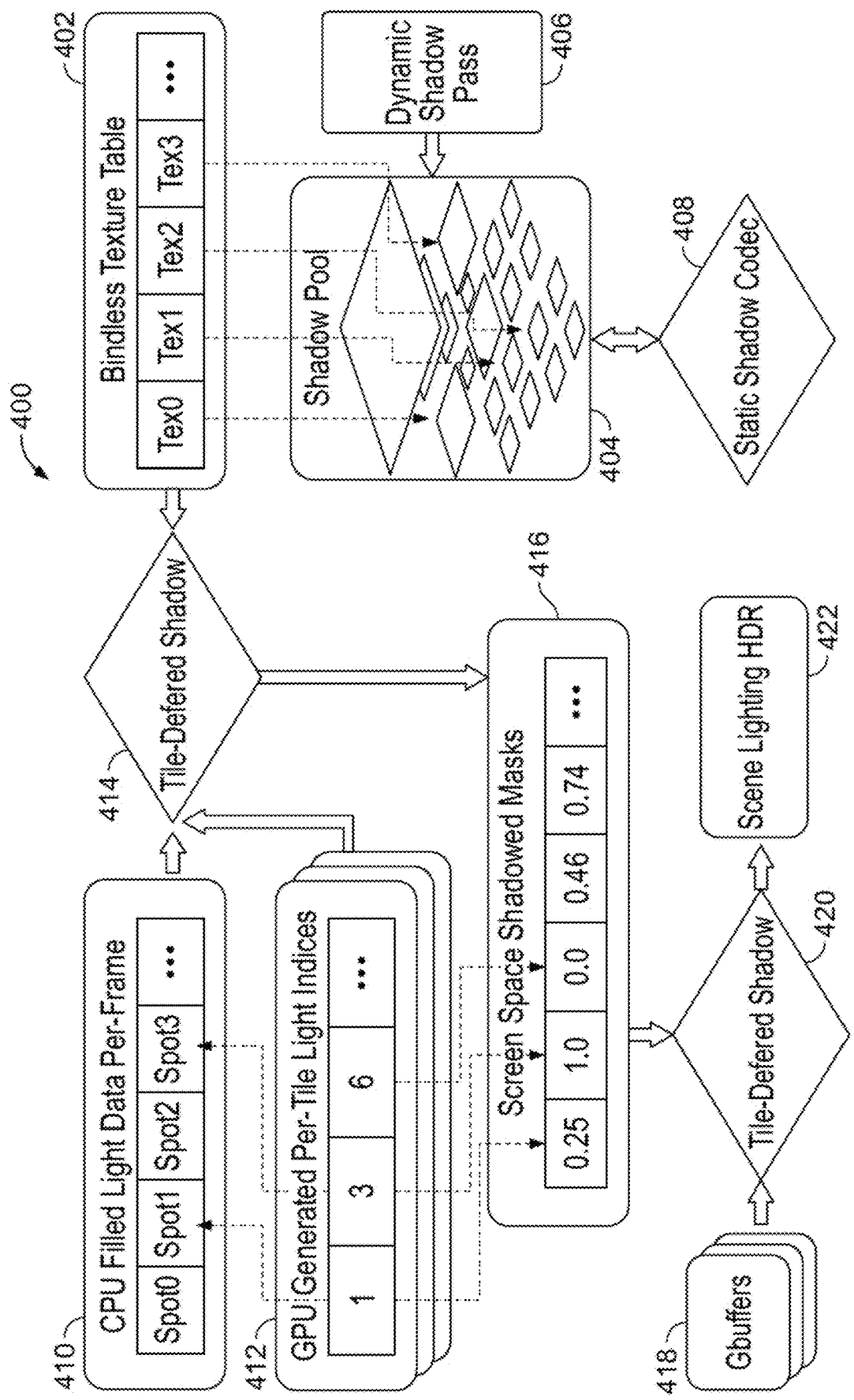
FIG. 4 is a block diagram illustrating a system an process for efficient shadow rendering able to handle large numbers of lights without noticeable lag in real-time applications.

FIG. 4 shows a system and process 400 for efficient shadow rendering able to handle large numbers of lights without noticeable lag in real-time applications. Elements of the system and process 400 include a bindless shadow texture table 402 used to build a pyramidal shadow pool 404 for access in real time by a static shadow codec 408 and dynamic shadow pass 406. The texture table 402 and related elements support tiled deferred shadow mapping 414 together with CPU-filled light data per frame data 410 and CPU-generated per-tile light indices 412. Tiled shadow maps 414 are filtered through screen space shadow masks 416 correlated to the tiled light indices 412 to support an tiled deferred shading process 420 that processes data in GPU buffers 418 to obtain scene lighting HDR 422 for many light sources in real time.

Figure 5:
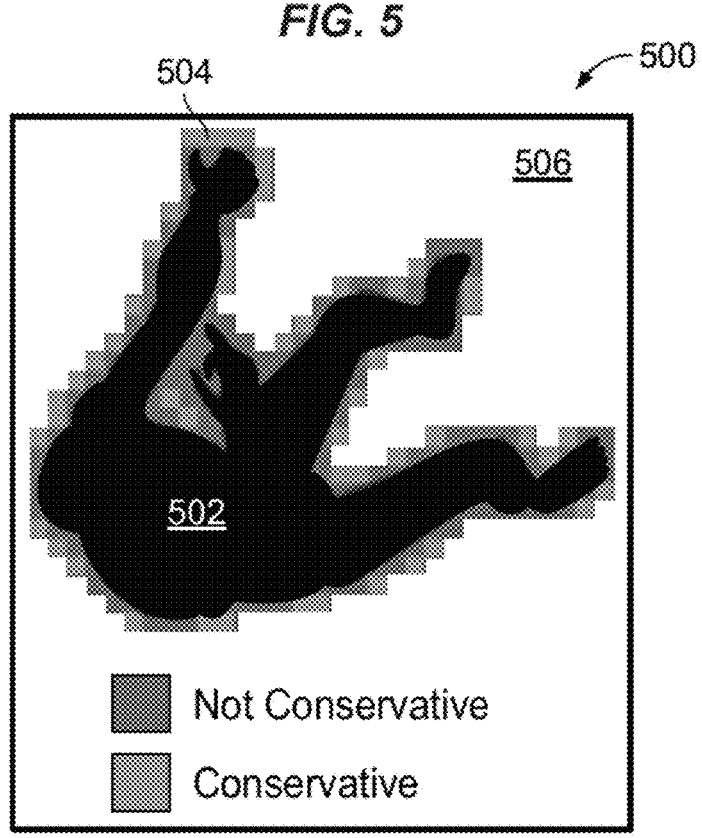
FIG. 5 is an enlarged view of a conservative dirty mask.

FIG. 5 is an enlarged view of a conservative dirty mask 500, showing how the source mask is surrounded by a conservative margin 504 that eliminates proximity of unmasked pixels 506 to the source mask 502 of less then 'n' pixels, wherein 'n' is an integer from 2 to 4. Other values of 'n' may also be suitable.

Using a correct depth slope-bias, defined by Filter-Kernel-Radius, may be essential for dynamic shadow mapping. Using a fixed depth bias will fail at high slope. The API should specify max(ddx(x), ddy(y)). Because many different shadow map resolutions are possible, a robust shadow bias that work at all resolutions is desirable. The present system is robust enough to enable removing shadow biasing setting for lighting artists. Shadow bias is often done incorrectly in traditional game engines. Depth bias should not be an artist input, should only be used for fixing quantization errors, and not to filter kernel-caused depth slope errors.

It may be desirable, for example when designing for game consoles, to handle dynamic shadow maps as efficient as possible. Dynamic shadow mapping may often be dominated by fixed costs such as buffer storage, compression, but not rendering. A dynamic mask texture may be used for partial decompression and to achieve a significantly greater efficiency and rendering speed.

Figure 6:
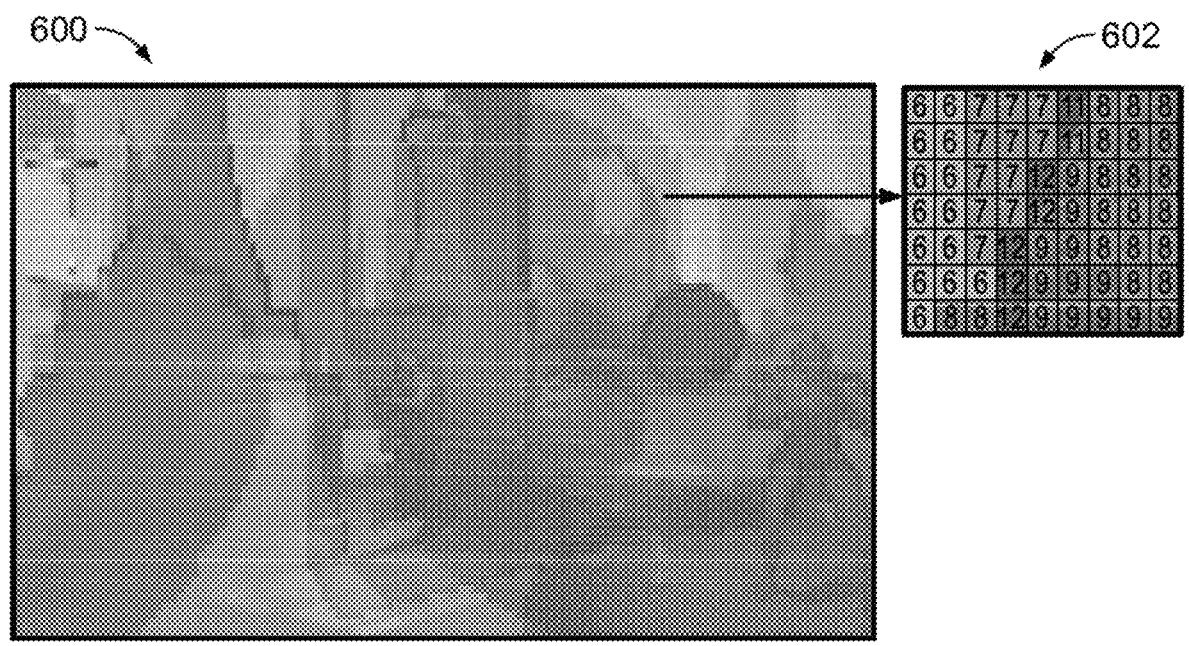
FIG. 6 is an example of a tiled shadow map with each tile assigned a count of light sources affecting the tile.

FIG. 6 shows an example of a tiled shadow map 600 wherein each tile is assigned a count of shadowed light sources affecting the tile. An enlarged view of the tile counts is shown at 602. The present tiled-deferred-shadow approach may provide various advantages, for example, simpler and more compact code, need for fewer vector general-purpose registers (VGPRs), separate spot and point shadow passes, reducing VGPRs and cache clearing. Further advantages may include using a bindless shadow table and output of tightly packed shadow masks.

A common issue with tiled shading is depth complexity. Deferred shadow is much more sensitive to false positives, because it wastes output slots very quickly in a high depth complexity scene. The present method uses a different and more efficient solution: a special sampling pattern in a tile to test if a light is really touching any samples. The sample is constructed such that each row and column has at least one sample, so the processing can capture very thin features in the scene, without missing any straight lights. The additional cost of individual depth sample test is only 0.1 ms for a frame but it works very effectively in a large environment.

Figure 7A:
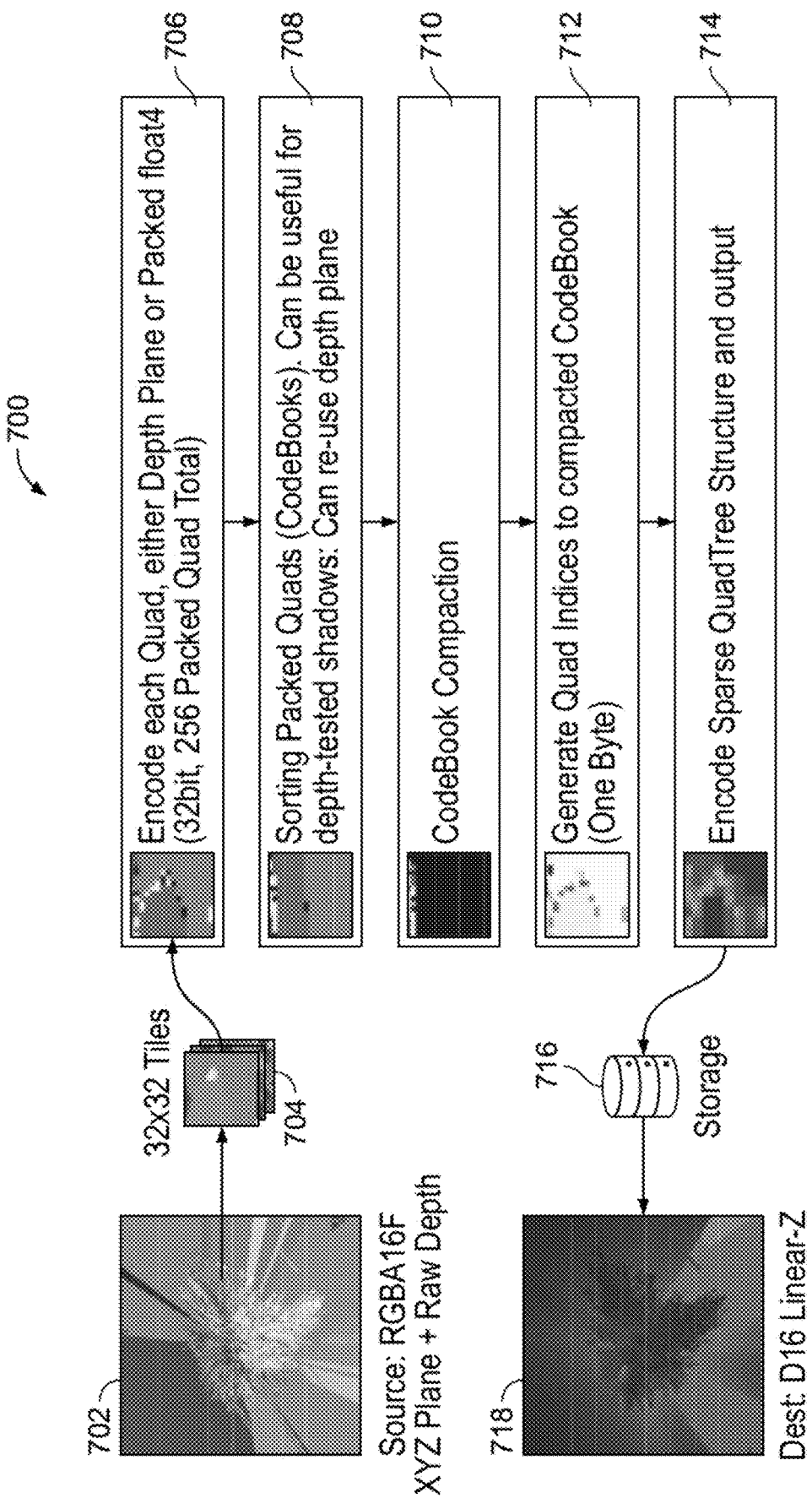
FIG. 7A is a flow chart illustrating a process for shadow map compression.

FIG. 7A illustrates a process 700 for shadow map 702 compression, including tiling 704, encoding 706, sorting 708, codebook compaction 710, generation of quad indices 712, and encoding of a sparse quad tree structure for storage 716, represented by the compresses shadow map 718 for use in real-time rendering as described herein. The shadow map compression is designed to achieve conservative error, meaning that even if compression is lossy, the process does not need to adjust any depth bias settings by using decompressed texture. Opportunities include omitting the need for static shadow rendering, overlapping (computing in parallel) the compute and graphics pipeline, using highly compressible depth textures, and reducing bandwidth and storage requirements.

The process 700 may begin with offline rendering a special type of temporally shadow map 702: depth plane XYZ in texture space, with plane Z re-centered to the middle of the tile for better precision. The processor may then separate the texture 702 into tiles of a set size (e.g., 32×32 pixels) and compress the tiles in a compute shader thread group. For example, a basic compression unit may be 2×2 quads, so tiles are either compressed to 32 bit lossy XYZ planes or 32 bit float4 (with shared floating point exponent). The result will be 256 compressed quads, suitable for using 1 byte indices in the quad tree nodes. Advantageously, the process 700 handles alpha tested images reasonably well by sorting and indexing. The process can re-use the same depth plane, even when the depth planes are scattered in the texture space, for example as happens with trees and grasses.

Average compression ratios may be around 20:1, in a range of 7:1 to 100:1, depending on the data source. In general, the larger the source texture, the better the compression ratio. The worst possible is 1.43:1 for a pure noise input. It may be possible to achieve 0.048 ms/MPixel, or less when combined with asynchronous compute, in decompression. On the compression side, a rate of 0.36 for a 1024× 1024 image on a Sony PS4™ base was achieved without optimization. A lane_shuffle instruction may be used for sorting or scan. In a test on a scene with over 2500 shadowed lights and unoptimized meshes, shadow rendering required less than 1 ms, reaching a performance gain to 15 times faster ($\frac{1}{15}^{th}$ time) compared to prior-art shadow renderers.

An important topic for deferred shadow system is the storage of the per-pixel, per-light shadow masks. In 4K era, many per-pixel shadow masks can quickly take a lot of memory and bandwidth. A naïve solution may be useful: simply reduce number of bits per shadow mask. However, it may be preferable to use block compression to reach bit rates less than 1 bit/light mask and compression of around 10:1, using vector quantization (VQ). Block compression VQ instead of pixel quantization may include training a codebook with a large amount of data, and using the codebook to find the best match of the input pixel block. The processor may store the indices only to this codebook for the whole block. Decode is extremely fast, the processor may just use the index to lookup the codebook table and obtain the result.

One problem may include how to search thousands of patterns in real-time. A solution may include skipping fully black or white blocks, so that the processor only compresses the shadow edge pixel masks. In addition, the processor may use a search tree, for example, a fully balanced quad tree, to minimize the number of comparisons needed. As a further improvement, the code may be limited to 2 useful hardware instructions to help us: Msad instruction normally used by video compression, adapted to sum comparison errors quickly; and laneswizzle to quickly sync data between threads without GroupShared memory. An example code 750 for block VQ compression is shown in FIG. 7B.

Advantages of the methods and systems described herein into being usable on current generation game consoles, ability to support thousands of shadowed lights in large environments, improved stability of framerate, minimal visual-popping, reasonable memory footprint, minimized run-time memory allocations, and support for efficient single-pass local-shadowed volumetric and transparent lighting scenarios.

Further aspect and details of the methods are described in the Appendix of the priority application U.S. Ser. No. 62/879,179, incorporated herein by reference, and elsewhere herein.

Figure 8:
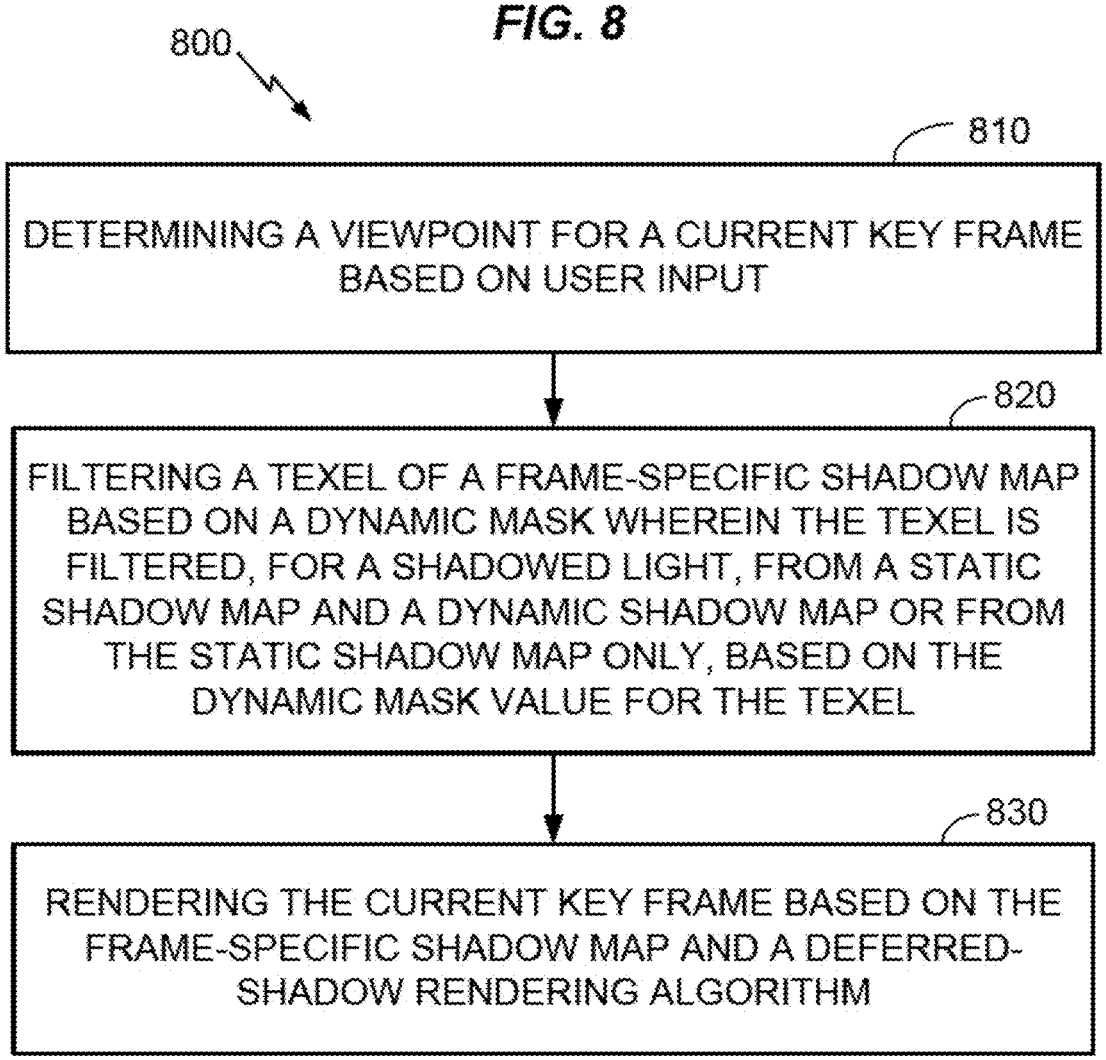
FIGS. 8-10 are flow charts illustrating a method for real-time shadow rendering using cached shadow maps and deferred shading, and optional aspects thereof.

In accordance with the foregoing, and by way of additional example, FIG. 8 shows more general aspects of a method 800 for real-time shadow rendering using cached shadow maps and deferred shading, as may be performed by a client device as described herein for real-time rendering. It should be appreciated that the more general operations of method 800 may include or embody more detailed aspects of corresponding methods described herein above.

Referring to FIG. 8, a computer-implemented method 800 for real-time shadow rendering using cached shadow maps and deferred shading may include, at 810, determining, by one or more processors, a viewpoint for a current key frame of interactive video, based on user input. For example, the processor may set parameters of a viewpoint according to an algorithm driven by user input. The viewpoint of the key frame and state of action of a 3D model that may also be driven by user input determines the content of the scene in the view frame.

The method 800 may further include, at 820, filtering by the one or more processors, a texel (e.g., each texel) of a frame-specific shadow map based on a dynamic mask wherein the texel is filtered, for a shadowed light, from a static shadow map and a dynamic shadow map or from the static shadow map only, based on the dynamic mask value for the texel. The one or more processors may perform the filtering 820 for each texel in the view frame. The filtering may include aggregating (e.g., adding or subtracting) values of corresponding texels to obtain combination values for one or more texels of the map. The one or more processors may include, or may be in, a graphics processing unit (GPU).

Figure 9:
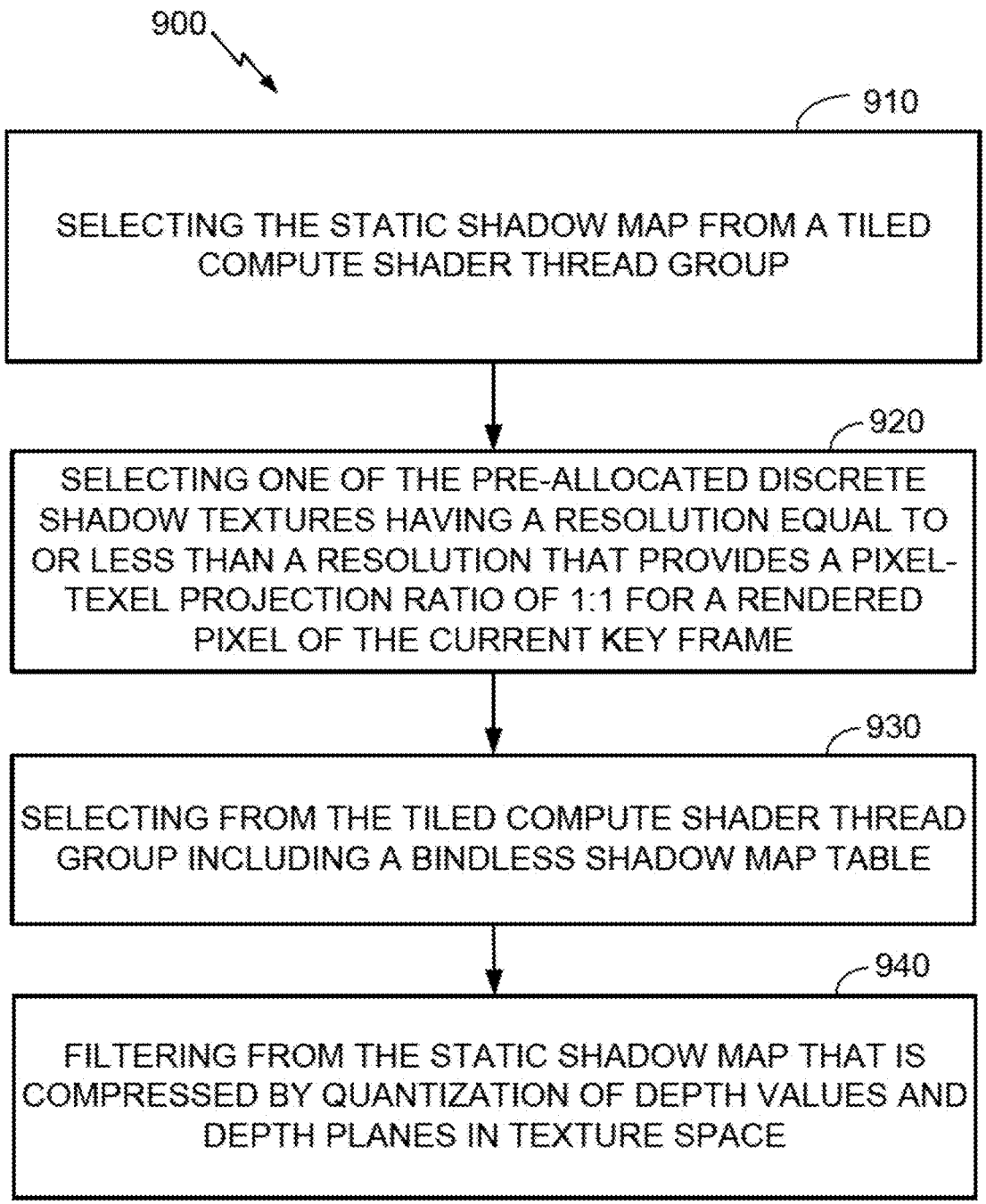

The method 800 may include any one or more additional operations 900, 1000 as described above and below in FIGS. 9-10 herein. Each of these additional operations is not necessarily performed in every embodiment of the method, and the presence of any one of the operations does not necessarily require that any other of these additional operations also be performed. For example, optionally, method 800 may further include, at 910, selecting, by the one or more processors, the static shadow map from a tiled compute shader thread group. The tiled compute shader thread group may be prepared offline by a method 1200 described in connection with FIGS. 12-14. The tiled compute shader thread group may include pre-allocated discrete shadow textures at different resolutions for the shadowed light. The method 800 may further include the selecting, at 920, of one of the pre-allocated discrete shadow textures having a resolution equal to or less than a resolution that provides a pixel-texel projection ratio of 1:1 for a rendered pixel of the current key frame. The method 800 may further include the selecting, at 930, wherein the tiled compute shader thread group includes a bindless shadow map table.

In another aspect, the method 800 may include, at 940, filtering from the static shadow map that is compressed by quantization of depth values and depth planes in texture space, as further described herein.

Figure 10:
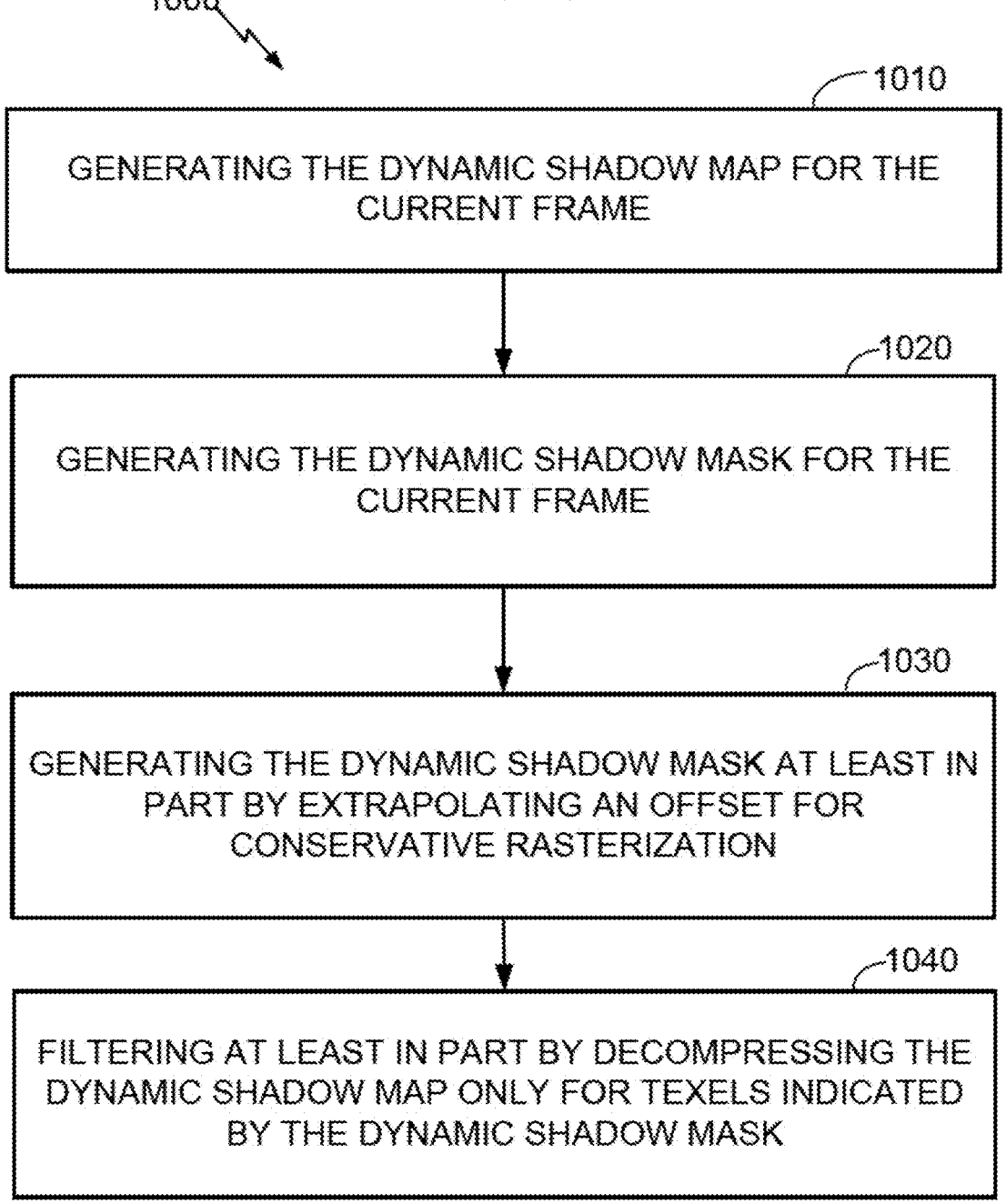

FIG. 10 shows further additional operations or aspects 1000 that may be included in the method 800. The method 800 may include, at 1010, generating, by the one or more processors, the dynamic shadow map for the current key frame. Likewise, the method 800 may include at 1020 generating, by the one or more processors, the dynamic shadow mask for the current key frame, for example by detecting all dynamic interactions with light bounding boxes in the frame. In an aspect, generating the dynamic shadow mask may include extrapolating, by the one or more processors, an offset for conservative rasterization beyond a mask covering only the dynamic objects in the scene. The filtering of method 800 may further include, at 1040, decompressing the dynamic shadow map only for texels indicated by the dynamic shadow mask.

Figure 11:
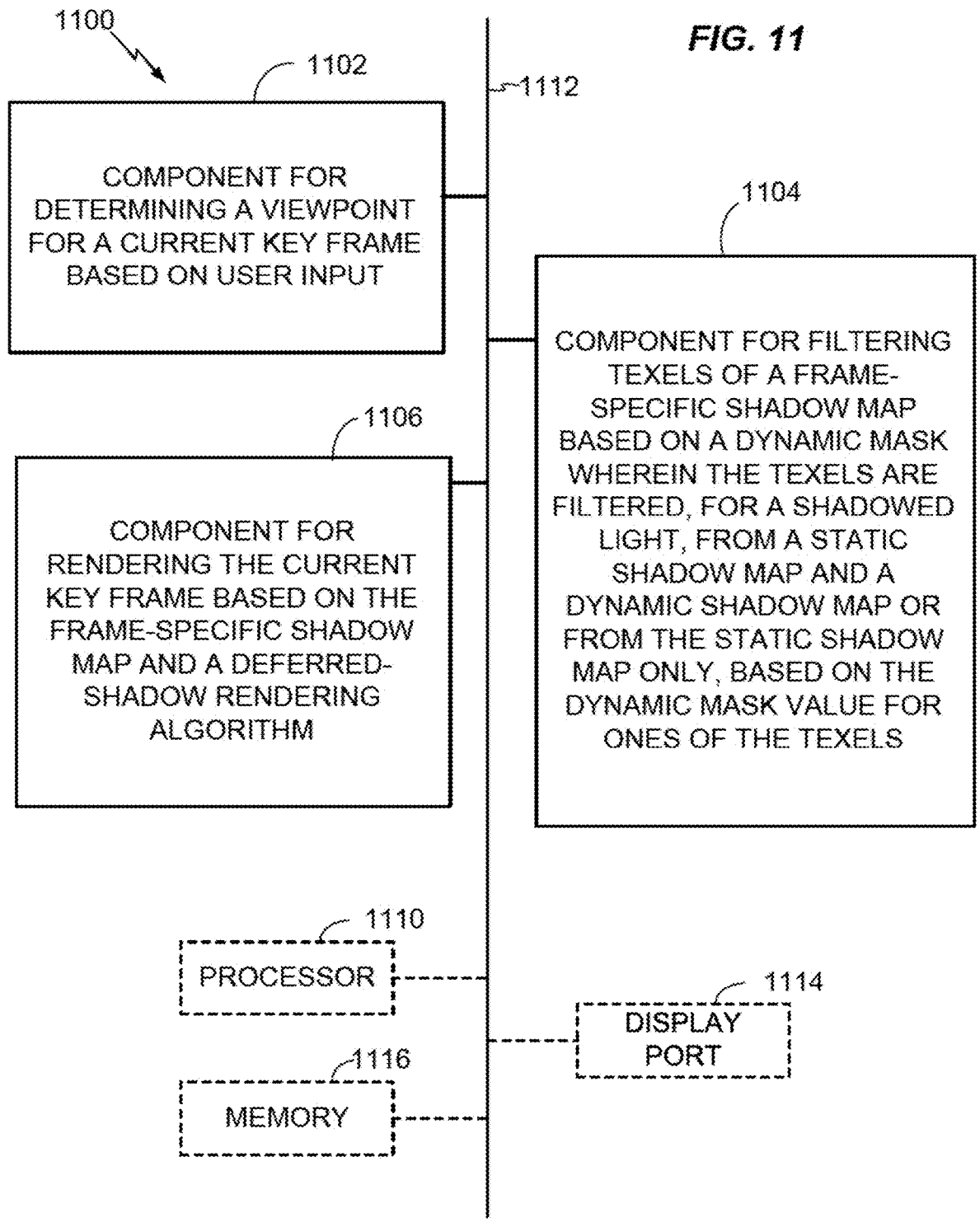
FIG. 11 is a conceptual block diagram illustrating components of an apparatus or system for real-time shadow rendering using cached shadow maps and deferred shading.

FIG. 11 is a conceptual block diagram illustrating components of an apparatus or system 1100 for real-time shadow rendering using cached shadow maps and deferred shading as described herein, according to one embodiment. As depicted, the apparatus or system 1100 may include functional blocks that can represent functions implemented by a processor, software, or combination thereof (e.g., firmware).

As illustrated in FIG. 11, the apparatus or system 1100 may include an electrical component 1102 for determining a viewpoint for a current key frame based on user input. The component 1102 may be, or may include, a means for said determining. Said means may include the processor 1110 coupled to the memory 1116, and to the display port 1114, the processor executing an algorithm based on program instructions stored in the memory. Such algorithm may include a sequence of more detailed operations, for example, altering a position and orientation of a virtual camera in a 3D environment in response to user input, capturing a current position orientation and position of the virtual camera at the current key frame, and applying a field of view using current camera parameters to generate limits of the current key frame.

The apparatus or system 1100 may further comprise an electrical component 1104 for filtering texels of a frame-specific shadow map based on a dynamic mask wherein the texels are filtered, for a shadowed light, from a static shadow map and a dynamic shadow map or from the static shadow map only, based on the dynamic mask value for the texels. The component 1104 may be, or may include, a means for said filtering. Said means may include the processor 1110 coupled to the memory 1116, and to the display port 1114, the processor executing an algorithm based on program instructions stored in the memory. Such algorithm may include a sequence of more detailed operations, for example, determining corresponding texels of the static and dynamic masks, determining whether a current texel of the dynamic map is excluded by the dynamic mask, combining values of the static and dynamic maps only if the current texel is not excluded by the mask and otherwise copying the value of the static mask only, and repeating the foregoing operations for multiple texels covering an area of interest.

The apparatus or system 1100 may further comprise an electrical component 1106 for rendering the current key frame based on the frame-specific shadow map and a deferred-shadow rendering algorithm. The component 1106 may be, or may include, a means for said rendering. Said means may include the processor 1106 coupled to the memory 1116, and to the display port 1114, the processor executing an algorithm based on program instructions stored in the memory. Such algorithm may include a sequence of more detailed operations, for example, applying a deferred-shadow rendering algorithm using the frame-specific shadow map to determine pixel values, and saving the rendered pixels in an image format for the current frame.

The apparatus 1100 may optionally include a processor module 1110 having at least one processor, in the case of the apparatus 1100 configured as a graphics processor, or a combination of graphics processors and at least one general computational processor of a CPU. The processor 1110, in such case, may be in operative communication with the modules 1102-1106 via a bus 1112 or other communication coupling, for example, a network. The processor 1110 may initiate and schedule the processes or functions performed by electrical components 1102-1106.

In related aspects, the apparatus 1100 may include a display port 1114 operable for providing a video signal to a display device. In further related aspects, the apparatus 1100 may optionally include a module for storing information, such as, for example, a memory device/module 1116. The computer readable medium or the memory module 1116 may be operatively coupled to the other components of the apparatus 1100 via the bus 1112 or the like. The memory module 1116 may be adapted to store computer readable instructions and data for effecting the processes and behavior of the modules 1102-1106, and subcomponents thereof, or the processor 1110, or the method 800 and one or more of the additional operations 900, 1000 described in connection with the method 800. The memory module 1116 may retain instructions for executing functions associated with the modules 1102-1106. While shown as being external to the memory 1116, it is to be understood that the modules 1102-1106 can exist within the memory 1116.

Figure 12:
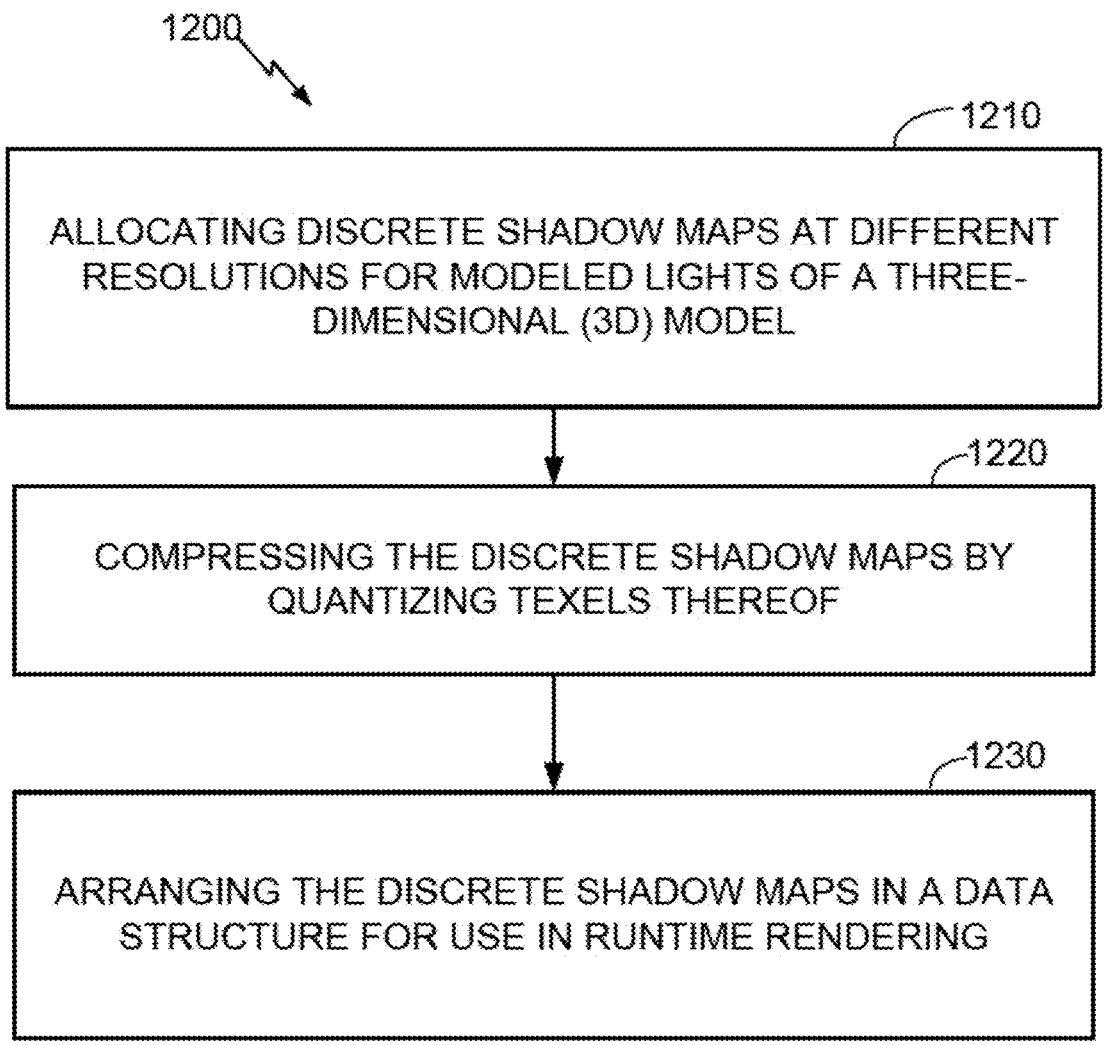
FIGS. 12-14 are flow charts illustrating a method for generating a tiled compute shader thread group for real-time shadow rendering using cached shadow maps and deferred shading, and optional aspects thereof.

In accordance with the foregoing, and by way of additional example, FIG. 12 shows aspects of a method 1200, as may be performed by a production server as described herein. It should be appreciated that the method 1200 may include or embody more detailed aspects of corresponding methods described herein above.

Referring to FIG. 12, a computer-implemented method 1200 for generating a tiled compute shader thread group for real-time shadow rendering using cached shadow maps and deferred shading may include, at 1210, allocating, by one or more processors, discrete shadow maps at different resolutions for modeled lights of a three-dimensional (3D) model. The method 1200 may further include, at 1220, compressing, by the one or more processors, the discrete shadow maps by quantizing texels thereof. For example, the one or more processors may quantize each texel of the maps as described in more detail herein. The method 1200 may further include, at 1230, arranging, by the one or more processors, the discrete shadow maps in a data structure for use in runtime rendering.

The method 1200 may include any one or more additional operations 1300, 1400 as described above and below in connection with FIGS. 13-14. Each of these additional operations 1300, 1400 is not necessarily performed in every embodiment of the method, and the presence of any one of the operations does not necessarily require that any other of these additional operations also be performed.

Figure 13:
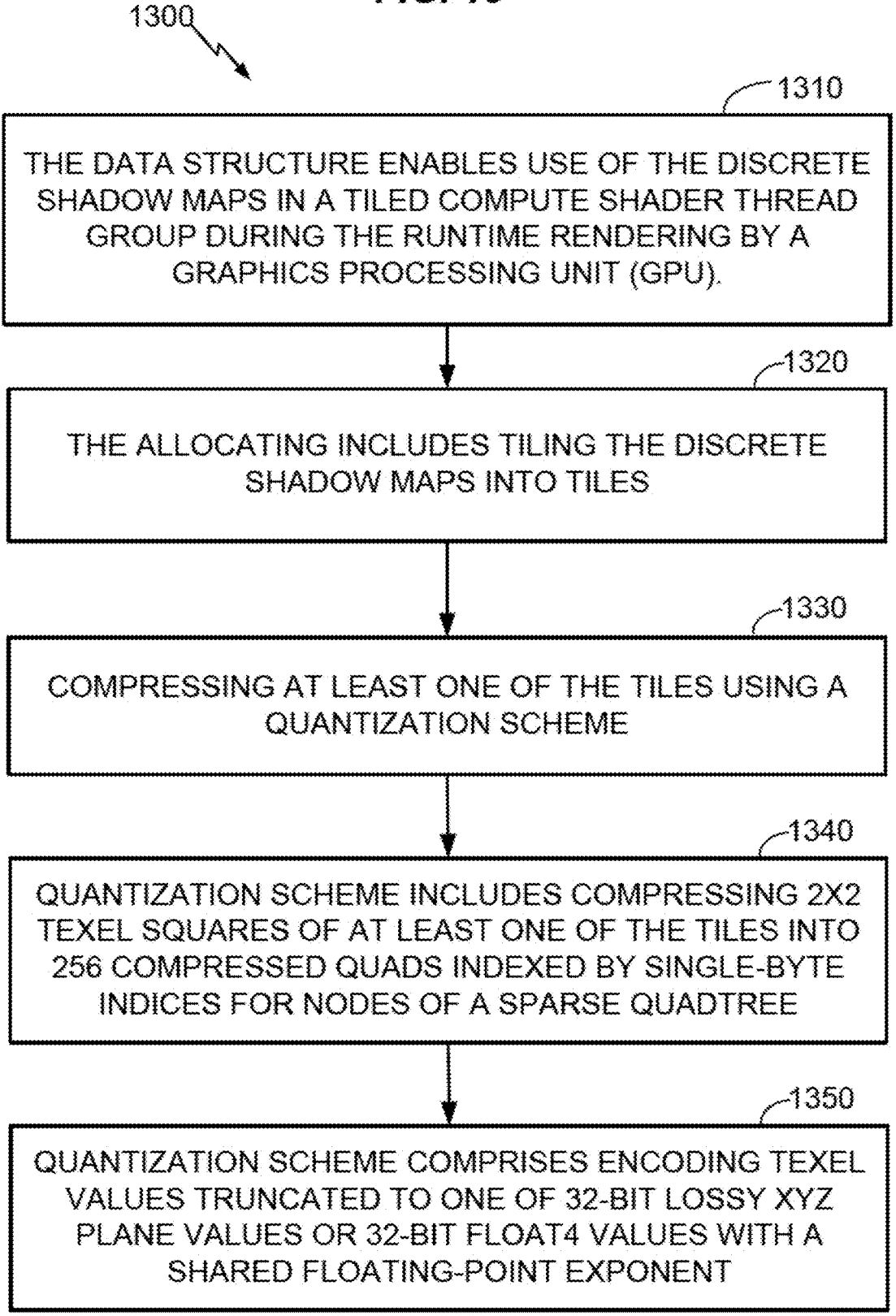

Referring to FIG. 13, the arranging operation of method 1200 may further include, at 1310, arranging the data structure to enable use of the discrete shadow maps in a tiled compute shader thread group during the runtime rendering by a graphics processing unit (GPU). The allocating operation of method 1200 may further include, at 1320, tiling (e.g., separating) the discrete shadow maps into tiles of a certain size, for example, into tiles of 32 texels square. The compressing operation of method 1200 may further include, at 1330, compressing at least one of the tiles using a quantization scheme. In an option illustrated at block 1340, the quantization scheme may include compressing 2×2 texel squares of at least one of the tiles into 256 compressed quads indexed by single-byte indices for nodes of a sparse QuadTree. In another option illustrated at block 1350, the quantization scheme may include encoding texel values quantized (e.g., truncated) to one of 32-bit lossy XYZ plane values or 32-bit float4 values with a shared floating-point exponent.

Figure 14:
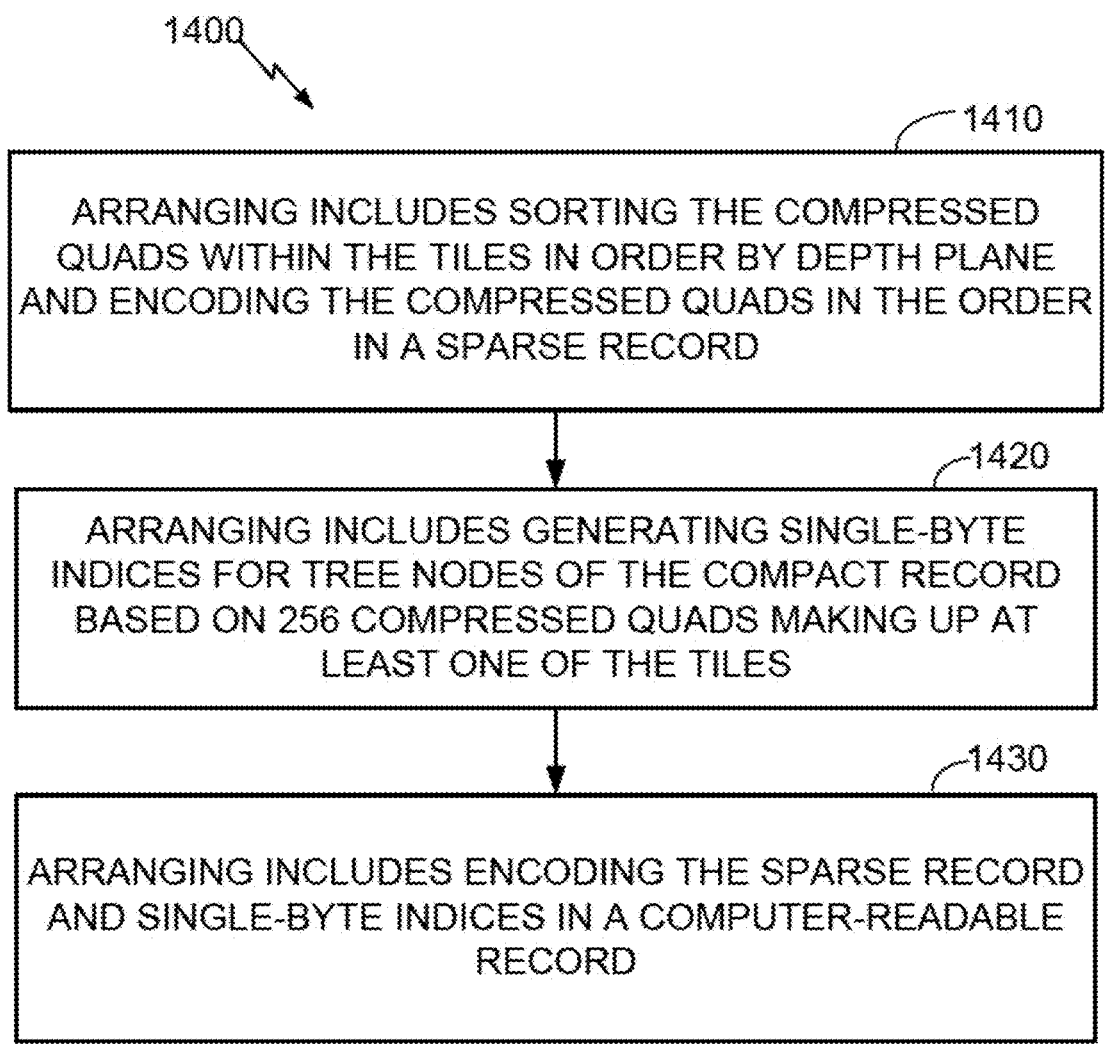

Referring to FIG. 14, the arranging of method 1200 may further include, at 1410, sorting the compressed quads within the tiles in order by depth plane and encoding the compressed quads in the order in a sparse record. In addition, the arranging 1230 may further include, at 1420, generating single-byte indices for tree nodes of the compact record based on 256 compressed quads making up at least one of the tiles. Further, the arranging 1230 may further include, at 1430, encoding the sparse record and single-byte indices in a computer-readable record.

Figure 15:
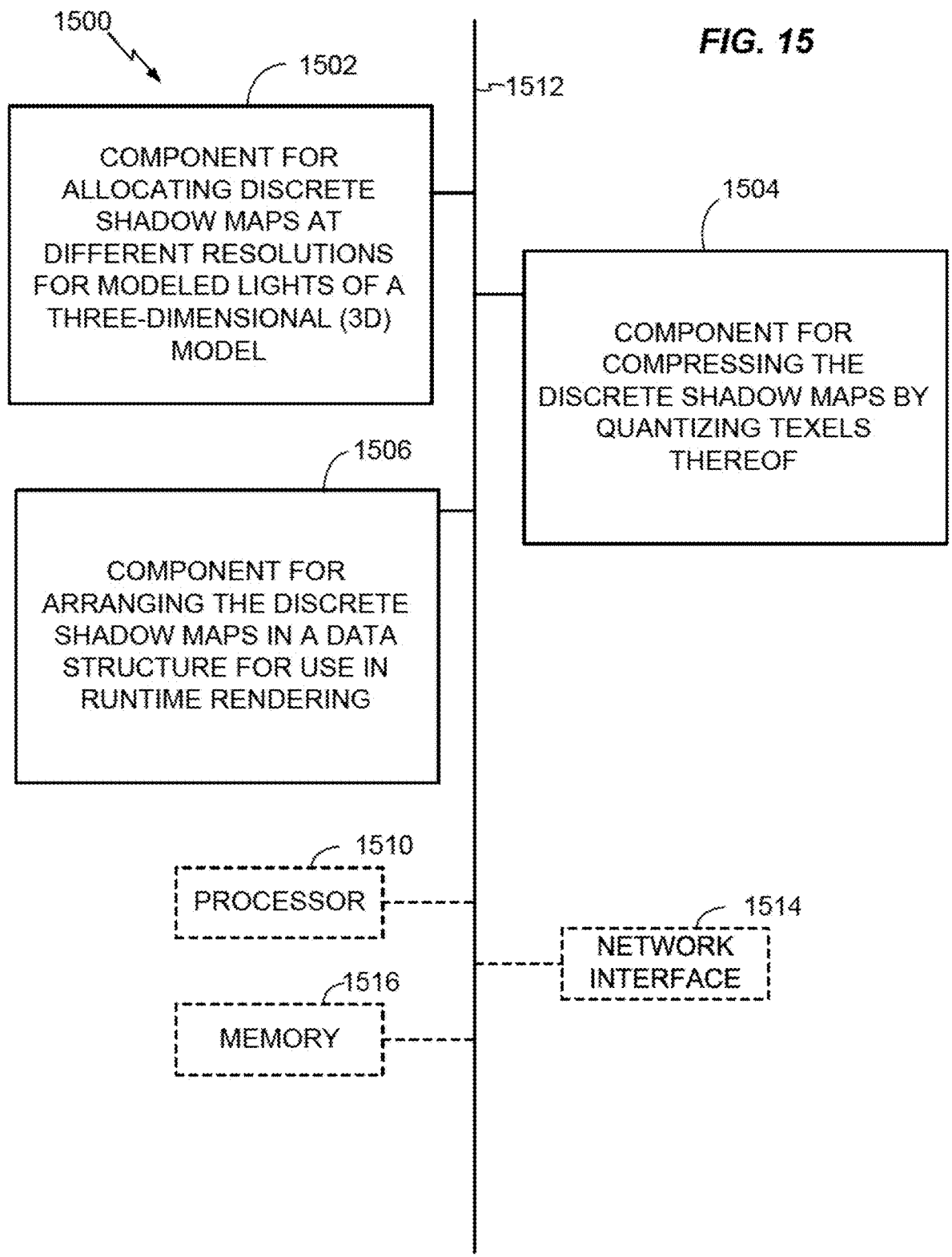
FIG. 15 is a conceptual block diagram illustrating components of an apparatus or system for generating a tiled compute shader thread group for real-time shadow rendering using cached shadow maps and deferred shading.

FIG. 15 is a conceptual block diagram illustrating components of an apparatus or system 1500 for generating a tiled compute shader thread group for real-time shadow rendering using cached shadow maps and deferred shading as described herein, according to one embodiment. As depicted, the apparatus or system 1500 may include functional blocks that can represent functions implemented by a processor, software, or combination thereof (e.g., firmware).

As illustrated in FIG. 15, the apparatus or system 1500 may comprise an electrical component 1502 for allocating discrete shadow maps at different resolutions for modeled lights of a three-dimensional (3D) model. The component 15 may be, or may include, a means for said allocating. Said means may include the processor 1510 coupled to the memory 1516, the processor executing an algorithm based on program instructions stored in the memory. Such algorithm may include a sequence of more detailed operations, for example, reading a tile size parameter, generating a static shadow map for each light source in a scene, and dividing each shadow map into tiles of a size determined by the size parameter, and setting a variable making the tiles recognizable in downstream processing.

The apparatus or system 1500 may further comprise an electrical component 1504 for compressing the discrete shadow maps by quantizing texels thereof. The component 1504 may be, or may include, a means for said compressing. Said means may include the processor 1504 coupled to the memory 1516, the processor executing an algorithm based on program instructions stored in the memory. Such algorithm may include a sequence of more detailed operations, for example, as outlined in any one or more of blocks 1330, 1340 and 1350 of FIG. 13.

The apparatus or system 1500 may further comprise an electrical component 1506 for arranging the discrete shadow maps in a data structure for use in runtime rendering. The component 1500 may be, or may include, a means for said arranging. Said means may include the processor 1500 coupled to the memory 1516, the processor executing an algorithm based on program instructions stored in the memory. Such algorithm may include a sequence of more detailed operations, for example, as outlined in any one or more of blocks 1410, 1420 and 1430 of FIG. 14.

The apparatus 1500 may optionally include a processor module 1510 having at least one processor, in the case of the apparatus 1500 configured as a data processor. The processor 1510, in such case, may be in operative communication with the modules 1502-1506 via a bus 1512 or other communication coupling, for example, a network. The processor 1510 may initiate and schedule the processes or functions performed by electrical components 1502-1506.

In related aspects, the apparatus 1500 may include a network interface module 1514 operable for communicating with a storage device over a computer network. In further related aspects, the apparatus 1500 may optionally include a module for storing information, such as, for example, a memory device/module 1516. The computer readable medium or the memory module 1516 may be operatively coupled to the other components of the apparatus 1500 via the bus 1512 or the like. The memory module 1516 may be adapted to store computer readable instructions and data for effecting the processes and behavior of the modules 1502-1506, and subcomponents thereof, or the processor 1510, or the method 1200 and one or more of the additional operations 1300, 1400 described in connection with the method 1200. The memory module 1516 may retain instructions for executing functions associated with the modules 1502-1506. While shown as being external to the memory 1516, it is to be understood that the modules 1502-1506 can exist within the memory 1516.

Those of skill would further appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

As used in this application, the terms "component", "module", "system", and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer or system of cooperating computers. By way of illustration, both an application running on a server and the server can be a component. One or more components may reside within a process and/or thread of execution and a component may be localized on one computer and/or distributed between two or more computers.

Various aspects will be presented in terms of systems that may include a number of components, modules, and the like. It is to be understood and appreciated that the various systems may include additional components, modules, etc. and/or may not include all the components, modules, etc. discussed in connection with the figures. A combination of these approaches may also be used. The various aspects disclosed herein can be performed on electrical devices including devices that utilize touch screen display technologies and/or mouse-and-keyboard type interfaces. Examples of such devices include computers (desktop and mobile), smart phones, personal digital assistants (PDAs), and other electronic devices both wired and wireless.

In addition, the various illustrative logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Operational aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

Furthermore, the one or more versions may be implemented as a method, apparatus, or article of manufacture using standard programming and/or engineering techniques to produce software, firmware, hardware, or any combination thereof to control a computer to implement the disclosed aspects. Non-transitory computer readable media can include but are not limited to magnetic storage devices (e.g., hard disk, floppy disk, magnetic strips . . . ), optical disks (e.g., compact disk (CD), digital versatile disk (DVD), BluRay™ . . . ), smart cards, solid-state devices (SSDs), and flash memory devices (e.g., card, stick). Of course, those skilled in the art will recognize many modifications may be made to this configuration without departing from the scope of the disclosed aspects.

The previous description of the disclosed aspects is provided to enable any person skilled in the art to make or use the present disclosure. Various modifications to these aspects will be clear to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

In view of the exemplary systems described supra, methodologies that may be implemented in accordance with the disclosed subject matter have been described with reference to several flow diagrams. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described herein. Additionally, it should be further appreciated that the methodologies disclosed herein are capable of being stored on an article of manufacture to facilitate transporting and transferring such methodologies to computers.

The invention claimed is:

1. A computer-implemented method for real-time shadow rendering using cached shadow maps and deferred shading, the method comprising, for at least each key frame of video output:
    determining, by one or more processors, a viewpoint for a current key frame based on user input;
    filtering, by the one or more processors, a texel of a frame-specific shadow map based on a dynamic mask wherein the texel is filtered, for a shadowed light, from a static shadow map and a dynamic shadow map or from the static shadow map only, based on the dynamic mask value for the texel; and
    rendering, by the one or more processors, the current key frame based on the frame-specific shadow map and a deferred-shadow rendering algorithm.

2. The method of claim 1, further comprising selecting, by the one or more processors, the static shadow map from a tiled compute shader thread group.

3. The method of claim 2, wherein the tiled compute shader thread group comprises pre-allocated discrete shadow textures at different resolutions for the shadowed light, and the selecting chooses one of the pre-allocated discrete shadow textures having a resolution equal to or less than a resolution that provides a pixel-texel projection ratio of 1:1 for a rendered pixel of the current key frame.

4. The method of claim 2, wherein the tiled compute shader thread group includes a bindless shadow map table.

5. The method of claim 1, wherein the static shadow map is compressed by quantization of depth values and depth planes in texture space.

6. The method of claim 1, further comprising generating, by the one or more processors, the dynamic shadow map for the current key frame.

7. The method of claim 1, further comprising generating, by the one or more processors, the dynamic shadow mask for the current key frame.

8. The method of claim 7, wherein generating the dynamic shadow mask comprises extrapolating, by the one or more processors, an offset for conservative rasterization.

9. The method of claim 1, wherein the filtering comprises decompressing, by the one or more processors, the dynamic shadow map only for texels indicated by the dynamic shadow mask.

10. The method of claim 1, wherein the one or more processors are in a graphics processing unit (GPU).

11. An apparatus for real-time shadow rendering using cached shadow maps and deferred shading, the apparatus comprising at least one processor coupled to a memory, the memory holding program instructions that when executed by the at least one processor cause the apparatus to perform for at least each key frame of video output:
    determining a viewpoint for a current key frame based on user input;
    filtering texels of a frame-specific shadow map based on a dynamic mask wherein the texels are filtered, for a shadowed light, from a static shadow map and a dynamic shadow map or from the static shadow map only, based on the dynamic mask value for the texels; and
    rendering the current key frame based on the frame-specific shadow map and a deferred-shadow rendering algorithm.

12. A computer-implemented method for generating a tiled compute shader thread group for real-time shadow rendering using cached shadow maps and deferred shading, the method comprising:
    allocating, by one or more processors, discrete shadow maps at different resolutions for modeled lights of a three-dimensional (3D) model;
    compressing, by the one or more processors, the discrete shadow maps by quantizing texels thereof; and
    arranging, by the one or more processors, the discrete shadow maps in a data structure for use in runtime rendering.

13. The method of claim 12, wherein the data structure enables use of the discrete shadow maps in a tiled compute shader thread group during the runtime rendering by a graphics processing unit (GPU).

14. The method of claim 12, wherein the allocating further comprises, by the one or more processors, tiling the discrete shadow maps into tiles.

15. The method of claim 14, wherein at least one of the tiles is 32 texels square.

16. The method of claim 14, wherein the compressing further comprises, by the one or more processors, compressing at least one of the tiles using a quantization scheme comprising compressing 2×2 texel squares of at least one of the tiles into 256 compressed quads indexed by single-byte indices for nodes of a sparse QuadTree.

17. The method of claim 14, wherein the compressing further comprises, by the one or more processors, compressing at least one of the tiles using a quantization scheme comprising encoding texel values truncated to one of 32-bit lossy XYZ plane values or 32-bit float4 values with a shared floating-point exponent.

18. The method of claim 14, wherein the arranging further comprises, by the one or more processors, sorting the compressed quads within the tiles in order by depth plane and encoding the compressed quads in the order in a sparse record.

19. The method of claim 18, wherein the arranging further comprises, by the one or more processors, generating single-byte indices for tree nodes of the compact record based on 256 compressed quads making up at least one of the tiles.

* * * * *